Dec. 11, 1962 — F. FRÜNGEL — 3,068,358
HIGH-FREQUENCY CAMERA WITH SPARK ILLUMINATION
Filed May 29, 1959 — 3 Sheets-Sheet 1
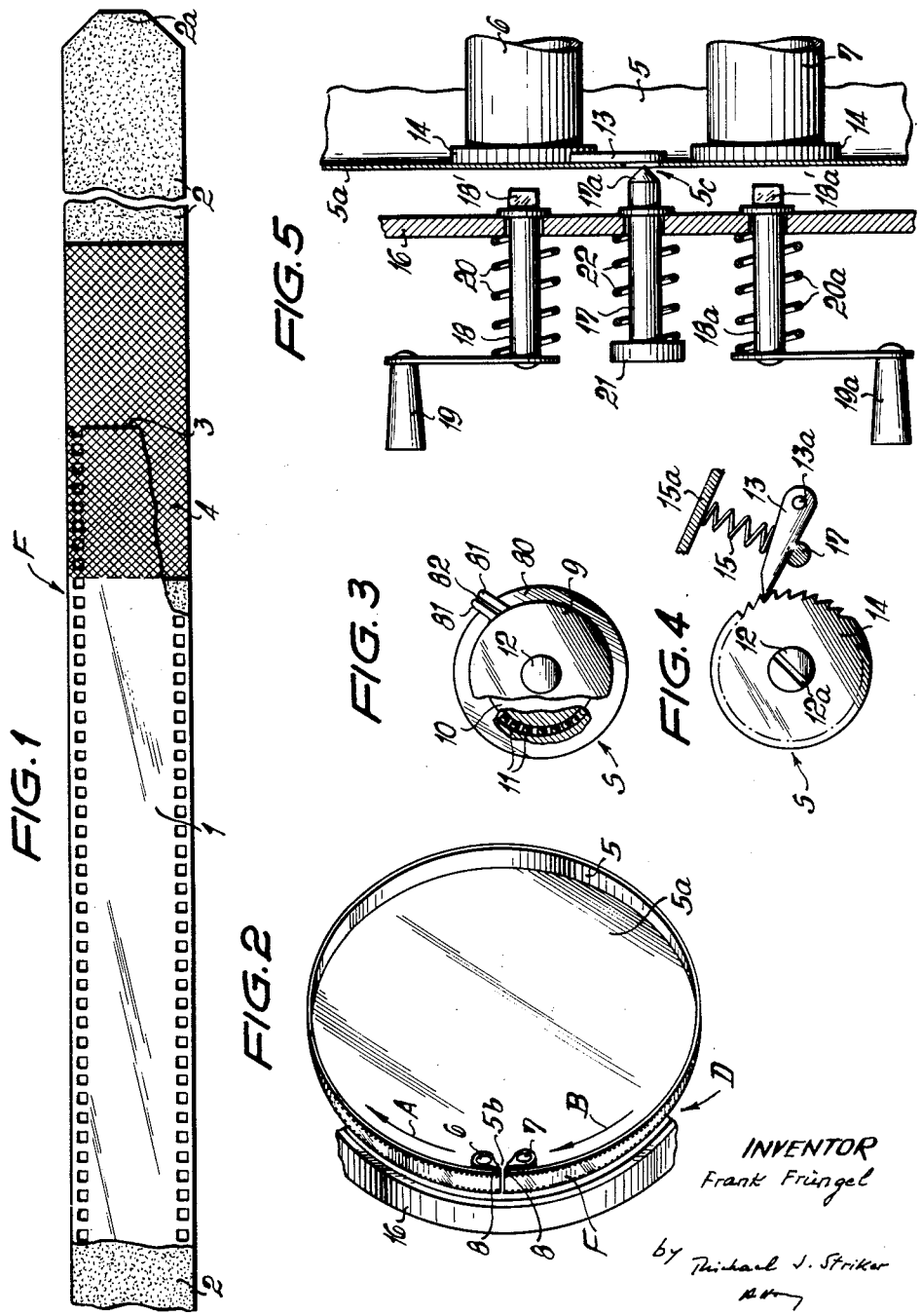
INVENTOR
Frank Früngel
by Richard J. Striker

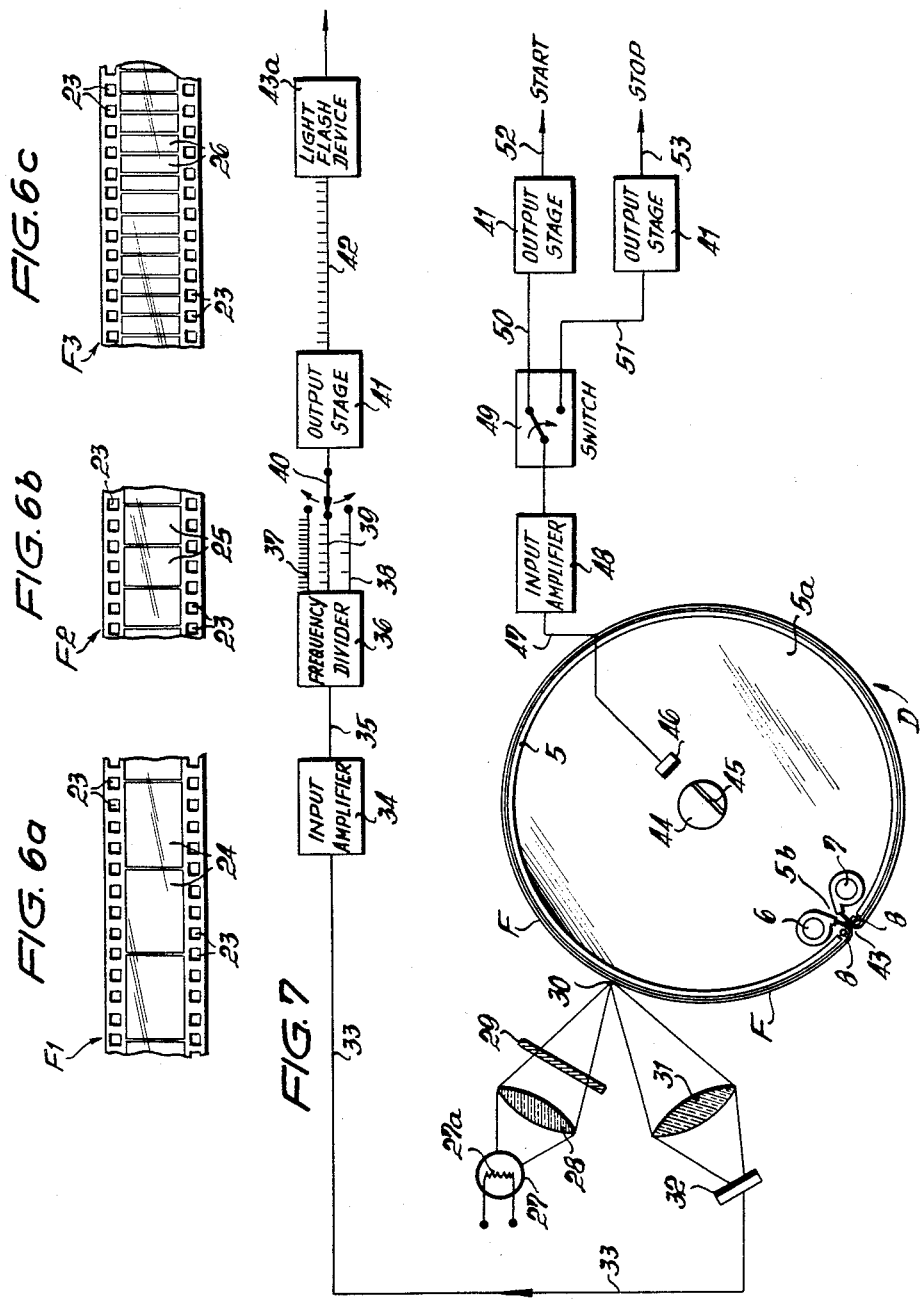

Dec. 11, 1962     F. FRÜNGEL     3,068,358
HIGH-FREQUENCY CAMERA WITH SPARK ILLUMINATION
Filed May 29, 1959     FIG. 8     3 Sheets-Sheet 3
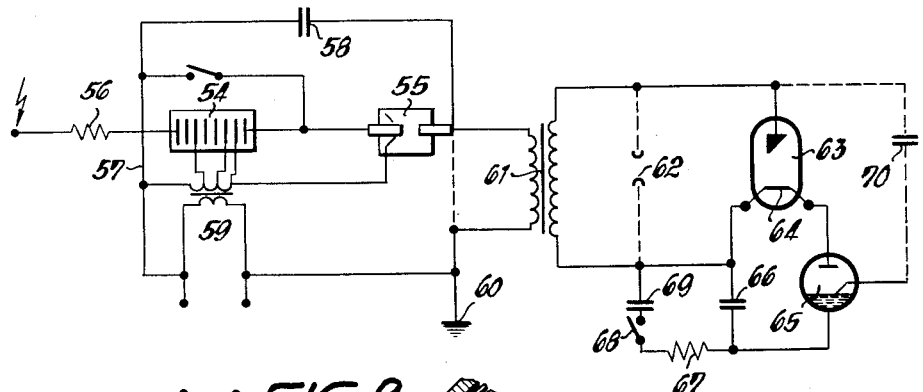
FIG. 9
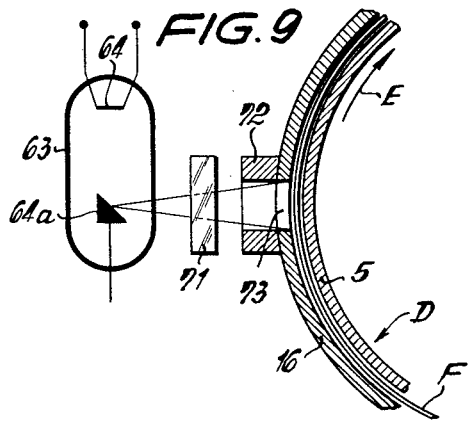
FIG. 10
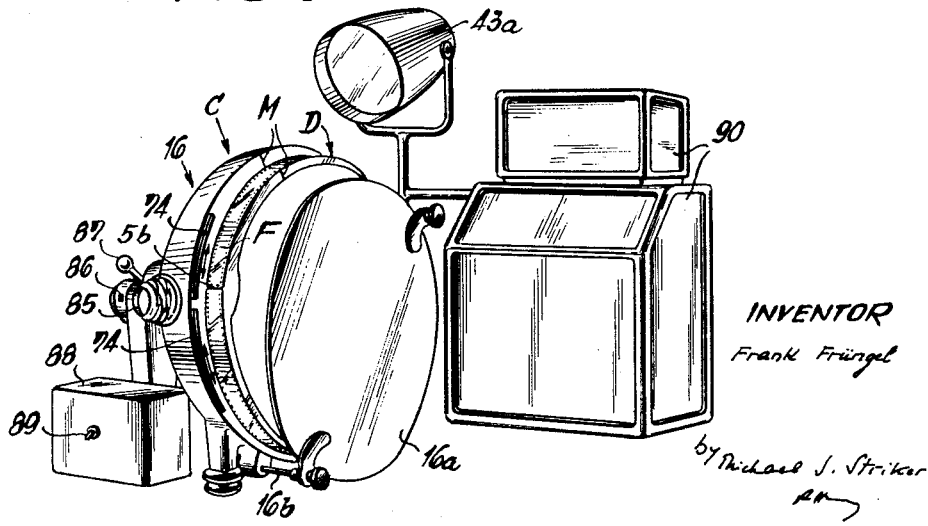
INVENTOR
Frank Früngel
by Michael J. Striker United States Patent Office 3,068,358
Patented Dec. 11, 1962

3,068,358
HIGH-FREQUENCY CAMERA WITH SPARK
ILLUMINATION
Frank Früngel, Wittenbergener Weg 79,
Hamburg-Rissen, Germany
Filed May 29, 1959, Ser. No. 816,804
Claims priority, application Germany May 30, 1958
12 Claims. (Cl. 250—65)

The present invention relates to high-speed drum cameras of the type in which the film passes about the periphery of a rotatable drum located in the camera housing and is payed out by a supply spool to be thereupon wound onto a take-up spool, in which both spools are located in the interior of the drum, and in which the exposure of the film occurs with spark illumination, i.e. by means of flashes which are synchronized with the perforations in the film or with the desired magnitude of the individual pictures, no optical balancing means, such as rotating prisms or the like, being required.

Slow-motion photographing of very rapid movements requires extremely high picture frequency, for example, 3000 exposures per second. Mechanical shutters are unsatisfactory for such purposes partly because of excessive inertia and partly because of insufficient light intensity, such as Kerr-cells. Controlled light flashes produce a light source of satisfactory intensity and, therefore, are preferred over mechanical shutters; the film is then caused to run continuously and the frequency of flashes must be regulated in such manner that a flash is discharged at intervals proportional with the speed of the advancing film, i.e. one light flash is discharged whenever the film is advanced a distance corresponding to the desired length of a single picture. In cameras of such type, the film is held under tension along the circumference or mantle of a drum which may revolve at a rotating speed of, say, 3600 revolutions per minute. Considerable centrifugal acceleration develops at such high rotational speeds especially since it is desirable to utilize drums of substantial peripheral length in order to permit utilization of films of practical length. For example, a film 1½ meters in length which is held on a drum rotating at 3600 r.p.m. has to stand up to centrifugal accelerations in the range of about 4 kg. This subjects the film material to much higher than normally anticipated stresses in addition to the fact that the film material must be applied to the periphery of the drum under considerable tension. In high frequency cameras of recent design, the supply spool which pays out the film and the take-up spool which receives the film are rotatably installed in the interior of the hollow drum. The mantle of the drum is formed with a slot or gap for the passage of the film which is paid out by the supply spool, the film thereupon passing about the mantle of the drum and being led through the same slot to the take-up spool. Since it is necessary to apply the film to the mantle of the drum under considerable tension, the rear side of the film is often damaged which, clearly, is a grave disadvantage of such cameras. In addition, when the film is inserted into the camera in bright daylight, i.e. when the initial part of the film is led about the mantle of the drum to have its free end connected to the core of the take-up spool, a length of photosensitive film material is wasted.

In addition to the above enumerated drawbacks and imperfections of known high frequency cameras, the control of light flashes, too, is complicated and very unreliable. If the discharge of flashes is irregular, the pictures will either overlap or will be unduly spaced from each other. Moreover, it is desirable that the discharge of flashes begin when the initial portion of the film is to be exposed since, if the discharge begins too late, a length of photosensitive film material is wasted and, furthermore, double exposures may occur. Many attempts were made to avoid such undesirable phenomena; for example, it was already suggested to operate the camera in synchronism with the flash producing and discharging system by means of an alternator or by a mechanical control device operated by the driving shaft of the drum. It has been found, however, that an optical control system which depends upon the usual perforations or sprocket holes in the film or upon the length of individual pictures is much more reliable. The presently known optical systems of such character are still in the early development stage and a truly satisfactory reproduction and spacing of images over the entire length of the film still remains a hit-and-miss proposition.

An important object of the present invention is to overcome the above enumerated drawbacks and deficiencies of presently utilized high-frequency cameras by the provision of a system for controlling the emission or discharge of light flashes in such manner that full advantage may be taken of the entire length of each film.

Another object of the present invention is to provide an improved system for controlling the discharge of light flashes in high-frequency cameras which is so constructed and which operates in such a way that excessive spacing between, and overlapping of, successive pictures is positively prevented.

A further object of the invention is to provide a high-frequency camera which is so constructed that a length of film may be inserted therein in broad daylight without exposure of photosensitive material.

A still further object of the invention is to provide an improved composite film strip for use in high-frequency drum cameras which may be inserted into the camera without exposure of photosensitive material.

A concomitant object of the instant invention is to provide an improved high-frequency drum camera which is capable of producing pictures with ordinary light flashes and/or with X-ray flashes.

A further object of the invention is to provide a high-frequency drum camera which may be utilized in connection with ordinary X-ray tubes.

Still another object of the invention is to provide a high-frequency drum camera which is so constructed that the tensional stresses to which the photosensitive film material is subjected are maintained within permissible limits regardless of the speed at which the drum is rotated.

Yet another object of the invention is to provide a camera of the above outlined characteristics in which friction acting on the film is greatly reduced and in which the inner or rear side of the photosensitive material cannot be damaged while the film advances about and rotates with the drum.

An additional object of the invention is to provide a simple and reliable system for correlating the frequency of ordinary light flashes or of X-ray flashes with the length in the longitudial direction of the film of individual pictures produced on the film.

Still another object of the invention is to provide an improved high-frequency drum camera with control means therefor which is of compact and lightweight construction, whose drum may be rotated at very high speeds, and which is constructed with a view to avoid any waste of photosensitive film material not only during insertion of the film but also when the film is exposed during picture taking.

A further object of the invention is to provide certain improvements in high-frequency drum cameras at least some of which may be incorporated in cameras of presently known design.

The above and many other objects of the invention are attained by the provision of an improved film for use in high-frequency drum cameras, by the provision of an improved transporting, advancing and arresting system for the film, and by the provision of an improved flash producing and controlling arrangement for the camera.

The improved film is a composite structure which consists of an elongated photosensitized band of known construction, and of a base strip therefor which is longer than the photosensitive member and whose strength, i.e., thickness, preferably greatly exceeds the latter's strength. The photosensitive layer or strip is attached to its base, e.g. by stitching, or fastening by means of adhesive materials, and both components are inserted into the supply spool in such a way that a length of the base corresponding substantially to the peripheral length of the drum must be withdrawn from the supply spool before the forward end of the light-sensitive layer becomes visible. Thus, when the camera housing is open and a loaded supply spool is inserted into the drum, the base may be placed about the drum in broad daylight and its forward or free end may be attached to the take-up spool without in any way exposing even a small portion of the photosensitive film portion. When the camera is closed to seal the spools and the drum within its housing, the photosensitive film portion is caused to advance about the periphery or mantle of the drum and is simultaneously subjected to requisite tension. It is desirable that at least a portion of the base in advance and past the point of its connection to the photosensitive film portion be made light-absorbent in order to prevent transfer of light through the body of the base to the photosensitive film in the supply spool.

The improved film advancing means comprises two spools at least one of which is mounted on antifriction bearings, e.g. ball bearings, to reduce friction during transport of the film. In addition, at least the supply spool, but preferably also the take-up spool is connected with a ratchet wheel which cooperates with a pawl mounted in the interior of the drum so as to positively arrest the spools when the drum rotates. The pawl or pawls may be released only when the drum is idle and preferably in a selected angular position of the latter which position may be marked by alignable indicia or the like. The means for releasing the pawl or pawls from engagement with the respective ratchet wheel or wheels may comprise a push-button externally mounted on the camera housing and having a spring-biased shaft extendable into the interior of the drum into engagement with the pawl.

The means for rotating the spools is preferably so constructed and mounted that it may engage with the respective spools only after the pawls are already disengaged from their ratchet wheels.

The system for controlling the discharge of flashes comprises a source of light for emitting light beams which are translated by reflection at the perforations or sprocket holes formed in the margin of the photosensitive layer portion of the composite film into light pulses which then generate electric impulses, one impulse being generated for each single perforation. Switch means is provided for permitting discharge of flashes in response to each single impulse, or selectively in response to each second, third, fourth, etc. impulse, depending upon whether a picture should be produced for each single perforation, for each second perforation, or for each third, fourth, etc. perforation, i.e. depending upon the length of pictures on the photosensitive film layer, thus producing ready for projection films of 8, 16 or 35 mm. width. A photoelectric cell may be provided to generate impulses causing switch means to establish the circuit which controls the discharge of flashes at a time when the starting point of the photosensitive layer is in front of the camera objective so as to avoid any waste of the film. Means may be provided for preventing double exposure, for example, by utilizing a condenser which is charged sufficiently for causing discharge of a single flash at a time.

The flash producing and controlling attachment preferably utilizes two groups of impulses the first of which is caused by the perforations in the margin of the photosensitive portion of the film, and the second of which is caused by the gap in the mantle of the camera drum through which the film is led while passing from the supply spool about the mantle of the drum and back to the take-up spool in the drum. Both series of impulses may be generated by a single photoelectric cell, the first series for causing actual discharge of light or X-ray flashes at a predetermined frequency, and the second series of impulses for permitting the discharge of flashes to start at a given point, namely, when the initial portion of the photosensitive film layer is in front of the camera objective, and also to stop the discharge of flashes after the drum has completed a full revolution. The photo-electric pick-up arrangement is combined with a discriminator system and a switch assembly. The second series of impulses may also be generated by a separate photoelectric cell which then preferably cooperates with a slot or bore in the shaft of the camera drum and receives light rays through an auxiliary light barrier constituted by a transverse off-center bore or slot which is aligned with the aforementioned gap in the mantle of the drum and thus permits passage of light rays from a suitable source through said gap and through the off-center bore when the gap passes in front of the light source. Since the starting zone of the photosensitive film layer is adjacent to the gap, the just described arrangement prevents any waste of the film.

The improved drum camera may be utilized for making X-ray flash pictures. The X-ray flashes are produced in a flash apparatus having the trade-name "Strobokin" and described in my copending application Serial No. 771,116, now U.S. Patent No. 2,906,924, by connecting an impulse transformer to the flash chamber of the flash apparatus whereby the previously described light flashes are replaced by voltage impulses from the impulse transformer serving to generate X-ray flashes. A conventional X-ray tube may be utilized for the production of comparatively strong X-rays by connecting the heating filament of the tube to a discharge condenser whose energy discharge is so controlled that it can heat the filament for a short period of time nearly to the melting stage but always below the actual melting point, i.e. the energy of the condenser should never suffice to actually melt the filament of the X-ray tube during the short discharge period.

The novel features which are considered as characteristic for the invention are set forth in particular in the appended claims. The invention itself, however, both as to its construction and its method of operation, together with additional objects and advantages thereof, will be best understood from the following description of certain specific embodiments when read in connection with the accompanying drawings, in which:

FIG. 1 shows a portion of the novel composite film whose base and light-sensitive layer are partly broken away;

FIG. 2 is a side elevational view of the drum with the take-up and supply spool installed in its interior;

FIG. 3 is a greatly enlarged end view of one spool with a portion of its flange broken away to reveal the antifriction bearings;

FIG. 4 shows the other end of the spool of FIG. 3 with the ratchet-and-pawl means for normally holding the spool against rotation with respect to the drum;

FIG. 5 is part elevational and part sectional view of the pawl-releasing and spool-winding means;

FIGS. 6a to 6c illustrate portions of three exposed films with pictures of different lengths in the longitudinal direction of the film;

FIG. 7 is a diagrammatic view of the entire optical and electronic system for producing and controlling the frequency and duration of flash-sequences;

FIG. 8 illustrates the circuit of an X-ray flash tube;

FIG. 9 illustrates the circuitry of the X-ray flash tube operatively connected with the high-frequency drum camera; and FIG. 10 is a perspective view or the fully assembled camera with the housing in partly open position.

As already mentioned hereinbefore, a serious disadvantage of presently known high-frequency cameras and films utilized therein is in that, due to extremely high centrifugal forces to which the film is subjected during rotation of the drum, the film must be led about the drum under considerable tension, i.e. it must be stretched on the mantle of the drum. Such mounting of the film brings about frequent damages to its rear or inner side which is in contact with the mantle of the drum, this resulting in inferior quality of reproductions obtainable from such films. In addition, a considerable part of rather expensive photo-sensitive material is lost during insertion of film into the camera, especially in broad daylight. The damage, i.e. scratching to the rear side of the film may be avoided by preventing direct contact between the film and the mantle of the camera drum, and also by reducing the friction between the drum and the film. The novel film and the improved camera have been designed in full consideration of these factors, and also with a view to prevent exposure of photosensitive material during insertion of film into the camera.

Referring now in full detail to FIG. 1, the combined or composite film F comprises a layer or strip 1 of photosensitive material and a base or backing strip 2. The length of base 2 at least slightly exceeds the peripheral length of the drum forming part of the high-frequency camera, and the base 2 is of great tensile strength though its material may be and normally is the same as that of layer 1. The latter is fixed to base 2 along the line 3, e.g. by stitching, whereby a length of base 2 extends beyond the free end of layer 1. The free end 2a of base 2 is preferably at least slightly pointed, i.e. it is cut off at a bias, as is shown at the right-hand end of FIG. 1, and extends through the slot or gap of the customary spool box when the latter contains the composite film F wound onto the core of its spool. At both sides of the connecting line 3, the base 2 is of light-absorbent characteristics which may be attained either by roughening and coating the base with a black substance, or by incorporation into its material of a dark dye. This light-absorbent zone of base 2 is indicated at 4; its purpose and advantages will be pointed out hereinafter.

FIG. 2 illustrates the drum D which comprises a mantle 5 and an end wall 5a. In its interior, the drum receives a rotatably mounted film supply spool 6 and a rotatable take-up spool 7. Both spools are closely adjacent to each other and are located close to a zone of the mantle 5 which latter is formed with an axially extending slot or gap 5b located between the spools 6, 7. Adjacent to both longitudinal sides of the slot 5b, the drum D supports a pair of deflecting rolls 8.

When it is desired to mount the film F onto the drum D, a length of base 2 is withdrawn from the supply spool 6 by pulling on the pointed end 2a, and the base is thereupon led through the slot or gap 5b, about the right-hand deflecting roller 8, along the outer side of mantle 5 in the direction of arrows A, B, about the left-hand deflecting roll 8, and back through the gap 5b to be finally affixed to the core of the take-up spool 7. The length of base 2 between the point or line of connection 3 and its end 2a is such that the photosensitive portion 1 remains hidden in the supply spool 6 when the free end 2a of the base is already connected to the core of the take-up spool 7. When the housing 16 of the camera is closed to fully surround the drum, the shaft and the core of take-up spool 7 are rotated in unison in such direction as to withdraw the photosensitive layer 1 from spool 6 and to lead it about the mantle 5 of drum D. Such winding of the film F, caused by rotation of the spool 7, simultaneously subjects the layer 1 to requisite tension. The diameter of drum D may be in the range of about 500 mm.

While traveling about the mantle 5, layer portion 1 remains in permanent contact with its base 2 and thus does not directly contact the drum; this results in prevention of any even very slight damage to the rear side of the photosensitive portion 1 regardless of the magnitude of tension or stretch to which the layer may be subjected. Since the highly flexible and tear-resistant material of base 2 is preferably fully transparent, the layer 1 could become "prefogged" or preexposed if the light were free to travel through the transparent body of base 2 into the supply spool 6, it being assumed that the film F is mounted onto the drum D in broad daylight. In other words, the base 2 could act as a light conductor to cause exposure of the photosensitive portion 1. This is avoided by the provision of the aforementioned light-absorbent zone 4 which is formed by incorporating a dark, preferably black dye into the material of base 2. However, it is generally satisfactory to merely roughen the outer sides of base 2 and to coat same with a suitable black substance. The length of such coated or light-absorbent zone 4 may be in the range of about 10–20 cm. Any light which may be conducted by the portion of base 2 between its end 2a and the zone 4 is totally absorbed by the latter and thus in no way affects the photosensitive portion 1 stored in supply spool 6 during mounting of the film F onto the drum D even if such mounting occurs in broad daylight or while the end portion of base 2 is exposed to strong artificial illumination. To merely roughen and coat the zone 4 of base 2 is particularly advantageous if the latter consists of a material which is difficult to impregnate with a dye or which does not take a dye at all.

The base 2 and layer 1 must be led about the mantle 5 of drum D under such tension that the film F cannot be lifted from the mantle when the drum D rotates, regardless of the magnitude of centrifugal forces to which the film is subjected during such rotation. As before stated, the centrifugal forces are considerable, i.e. in the range of about 4 kg. when the length of film F reaches 1½ meters or thereabouts. Thus, when the take-up spool 7 is rotated to sufficiently tension the film F and to simultaneously withdraw same from the supply spool 6, considerable friction develops between the base 2 and the outer side of mantle 5 which friction would be sufficient to cause damage to the rear side of the record medium. In order to avoid such damage, i.e. to avoid scratching of the film, the friction must be reduced while maintaining the layer 1 and its base 2 under requisite tension. When the film is stretched or tensioned, its free end 2a which is connected to the core of the take-up spool 7 is subjected to a tensioning force $K_2$ which may be calculated as follows:

$$K_2 = K_1 \cdot e^{\mu \alpha}$$

wherein $K_2$ is the tensioning force at the point of connection of base 2 to the take-up spool 7; $\mu$ is the coefficient of friction between the record medium F and the mantle 5 of drum D; $\alpha$ is the angle of contact between the mantle 5 and film, i.e. this angle is close to 360° minus the shortest distance between deflecting rolls 8; and $K_1$ is the force acting upon that end of film F which is connected to the core of supply spool 6.

It has been determined that the force $K_1$ is due mainly to existence of frictional forces in the bearings on which the supply spool 6 is rotatably mounted and also to frictional forces developing between the supply spool and the film F. In order to reduce the magnitude of force $K_2$, it is necessary to reduce the frictional forces in supply spool 6 as much as possible since, as a glance at the above formula will show, such frictional forces are directly proportional with the magnitude of tensioning force acting upon the free end 2a of the film base. In accordance with my invention, at least one end of spool 6 is rotatably mounted on antifriction bearings, preferably ball bearings. It is further desirable to reduce the friction between the box or receptacle in which the supply spool 6 is received and the film F, i.e. to reduce the friction between the walls surrounding the slot or gap through which the film F passes when it is withdrawn from the box surrounding the supply spool 6. As is known, the film discharge gap in the mantle of a spool box is usually surrounded by a light trap of velvet-like material and, in order to further reduce friction between the film F and the spool box, the velvet of the light trap sealing the exit slot in the spool box should be very soft and of nonfrictional characteristics. After exposure to light, the film F is rewound from spool 7 onto the supply spool 6; therefore, the spool 7, too, should preferably be mounted on antifriction bearings and the light trap in the discharge gap of its box should be of non-frictional and very soft velvet-like material.

A spool S which may either represent the supply spool 6 or the take-up spool 7 is shown in FIG. 3. It comprises a hollow core 10 connected to and coaxially receiving a shaft 12, ball bearings 11 surrounding the core 10 at least at one end of the latter, and a flange or end disc 9. There is further shown the spool box 80 with its film discharge slit 81 and velvet light trap 82.

When the film F is properly mounted on the mantle 5 and is under requisite tension, spools 6 and 7 must be positively arrested since they must take up the centrifugal accelerating forces developing in and acting upon the film when the drum D rotates. The means for positively arresting the spools 6 and 7 comprises a ratchet-and-pawl system, preferably for each spool, one of which is shown in FIGS. 4 and 5. The spool S shown in FIG. 4 carries at its end, opposite that shown in FIG. 3, a ratchet wheel 14 one tooth of which is shown engaged by a pawl 13 pivotally mounted on a pivot axle or pin 13a carried by the end wall 5a of drum D (see FIG. 5). The pawl 13 is constantly biased by one end of a helical spring 15 the other end of which abuts against a stop 15a connected to the inner side of end wall 5a. The pawl may be disengaged from an engaged tooth of ratchet wheel 14 by the conical end 17a of a shaft 17 which is axially slidably mounted in the housing 16 of the camera and may be pushed through an opening 5c in end wall 5a toward the pawl 13 by a push-button or head 21 which is external to the housing 16. The shaft 17 is constantly biased in a direction away from the pawl 13 by a coil spring 22 which operates between the head 21 and the outer side of housing 16. Ratchet wheel 14 is connected to the end of spool shaft 12.

It will be readily understood that each pawl 13 may be disengaged from its associated ratchet wheel 14 only when the drum D is at a standstill and only in a selected angular position of the latter. Such position may be readily located by providing suitable markings M on the end wall 5a of drum D and/or on the casing or camera housing 16.

FIG. 5 further shows a pair of cranks 19, 19a for rotating the spools 6, 7, respectively. These cranks can be coupled with the shafts 12 of respective spools only in a selected angular position of the drum which is identical with that in which the end 17a of shaft 17 is aligned with the opening 5c in the end wall 5a of drum D. Shafts 18, 18a of cranks 19, 19a, respectively, are axially slidably mounted in the camera casing 16 and are constantly biased in a direction away from spools 6, 7 by springs 20, 20a, respectively. Shafts 18, 18a are formed with flat end portions 18', 18a', respectively, which can enter the diametral recesses 12a in the shafts of spools 6,7 (one shown in FIG. 4) to bring about rotation of the spools when the cranks are rotated. Only one pawl 13 is shown in FIG. 5, namely, the one which normally engages with the ratchet wheel 14 of supply spool 6, but it will be readily understood that the shaft 17 of pushbutton 21 may simultaneously control a second pawl for the ratchet wheel of take-up spool 7, or that the pawl 13 of FIG. 5 may be formed as a double pawl to simultaneously engage with its opposed ends the ratchet wheels of both spools, if desired. Alternatively, a second push-button may be provided to control the pawl which normally engages with the ratchet wheel of take-up spool 7.

The unwinding of film F from the spool 6 and the rewinding of the film onto said spool occurs in the following manner: When the drum D is idle, it is first turned through an angle of less than 360° to align the conical end 17a of shaft 17 with the aperture 5c in the end wall 5a, the rotation of the drum into such position being facilitated by the non-represented markings. The pushbutton 21 is then depressed against the action of resilient element 22 to disengage the pawl 13 from the ratchet wheel 14 of supply spool 6. The shafts 18, 18a are then depressed against the action of springs 20, 20a, respectively, whereby their ends 18', 18a' engage the shafts 12 of spools 6, 7, respectively, to rotate the latter by means of cranks 19, 19a. Depending upon the direction in which the cranks are rotated, the film is paid out by spool 6 to be wound onto the spool 7, or vice versa.

Not only static but also dynamic balancing of the drum with all its components including the film F is a must for proper operation of the camera.

The so far described improvements fully prevent scratching of the film surface and also prevent the film from yielding to centrifugal forces when the drum rotates. The irregularities in the exposure and in proper timing of light or X-ray flashes are prevented by the novel arrangement shown in FIGS. 7 to 9. As is known, the presently utilized films for cameras are normally formed with perforations or sprocket holes which extend in at least one but usually in two rows along the edges of the film. As already stated hereinbefore, it is also known to utilize such perforations for synchronizing the light flashes. The time intervals between successive flashes depend upon the length of each picture in the longitudinal direction of the film. For example, when utilizing a film of 35 mm. width, a full-sized picture may extend along four successive perforations; thus, one light flash must be discharged for each fourth perforation. It is often desirable to double the picture frequency, i.e. to form a series of pictures each of which extends along two successive perforations and, consequently, the frequency of light flashes, too must be doubled. Finally, it may be desirable in certain instances to produce pictures each of which is of a length corresponding to the distance between the centers of two adjacent perforations; consequently, a light flash must be discharged for each single perforation in the film.

FIG. 6a shows a film $F_1$ having two rows of perforations 23 whereon the length of pictures 24 corresponds to the distance between the centers of first, fifth, ninth, thirteenth, etc. perforations. In FIG. 6b, the length of pictures 25 on film $F_2$ is reduced in half, i.e. their lengths correspond to the distance between the centers of first, third, fifth etc. perforations 23. FIG. 6c shows a film $F_3$ whereon the length of pictures 26 corresponds to the distance between the centers of adjacent perforations 23. For example, a film $F_3$ having a photosensitive layer of 1½ meters length may have as many as 300 pictures, i.e., the length of each picture 26 is about 5 mm. It has been shown that between 100 –300 exposures of a rapid movement are fully satisfactory for a photographic analysis.

The scanning or sensing of perforations 23 is performed via an infrared light barrier or filter which is shown schematically in FIG. 7. An image of filament 27a of a lamp or light source 27 is formed on the marginal zone of film F, the perforated light rays passing from source 27 through an optical system consisting of one or more lenses 28 and through a suitable infrared filter 29 before reaching the film F which is drawn tight about the outer side of mantle 5 so that its photosensitive layer is exposed to the light rays coming from source 27. The light is reflected at the scanning point 30 to be focused by a second optical system of one or more lenses 31 onto an impulse producing device 32, such as a photoelectric cell, a photodiode or a photoresistance. The current impulses generated by device 32 are conveyed through a line or conductor 33 to the electronic system which controls the frequency of and produces the light flashes. An impulse is produced by the device 32 for each single perforation 23 since consecutive scanning points 30 are located on a line which passes over the one or the other row of perforations on the film F, and each impulse may cause the discharge of a light flash if the film is the one shown in FIG. 6c, i.e. the film $F_3$ on which the length of each image 26 corresponds to the distance between the centers of two adjacent perforations. However, if it is desired that only each second perforation should bring about the discharge of a light flash, i.e. to form images or pictures 25 shown on the film $F_2$ of FIG. 6b, each perforation will still cause the cell 32 to produce an impulse but only each second impulse will be permitted to produce a light flash. Analogously, each perforation will cause the cell 32 to produce an impulse but only each fourth impulse will produce a light flash if the length of pictures 24 should be such as shown on the film $F_1$ of FIG. 6a. In other words, means must be provided to control the frequency of light flashes which may be produced in response to all or only in response to certain selected impulses out of those generated by means 32 for each one of a row of perforations 23. As is shown in FIG. 7, such control system comprises an input amplifier 34 which is connected to and receives impulses from impulse line 33, the amplified impulses being thereupon transmitted through a line 35 to a frequency divider stage 36, preferably a univibrator system of the Eccles-Jordan type. Impulse trains of different frequencies are conveyed through three separate channels 37, 38, 39, respectively, to a selector switch 40. Channel 37 conveys impulses with the basic frequency, i.e. one impulse for each successive perforation; channel 38 conveys impulses at half the basic frequency; and channel 39 only conveys impulses generated by the device 32 for each fourth perforation 23. The voltage and form of impulses in channels 37, 38 and 39 are normalized, independently of the angular speed of the drum D, and so transmitted to switch 40. Impulses passing from switch 40 are conveyed to an output stage 41 and thence as output signals through a conductor 42 to the schematically shown light flash producing apparatus 43a, e.g. that known by the trade-name "Strobokin," of known design (U.S. Pat. 2,906,924). Depending upon the momentary position of switch 40, impulse trains from either one of channels 37–39 may be conveyed to the light-flash producing apparatus 43a.

It is also important that the discharge of light flashes begin at the time when the forward end of film F passes in front of the objective of the drum camera (see FIG. 10). It has been found that an optical irregularity can be detected by a photoelectric cell arrangement monitoring the point 43 which corresponds to the location of the clearance or gap 5b in mantle 5 between the deflecting rolls 8. The present invention takes advantage of this possibility by providing an electronic switch (not shown) which is also controlled by the photoelectric cell 32 which performs the above described function of generating impulses to be transmitted to the light-flash producing apparatus connected to conductor 42. In other words, a single photoelectric cell 32 may control the frequency of light flashes and may simultaneously determine the exact time when the discharge of light flashes of predetermined frequency should begin. When the point 30 coincides with point 43, i.e. with the location of gap 5b, while the drum D rotates, the last mentioned switch is thrown from its idle into another position to close the circuit for transmission of flash-producing impulses and is thrown back into its initial or idle position when the drum D completes a full revolution and point 30 again coincides with point 43.

As an alternative, i.e. instead of utilizing a single photoelectric cell 32 for generating the flash-producing impulses and for starting and ending a series thereof, the shaft 44 of drum D may be formed with a transverse bore 45 which does not pass through the axis of member 44 and which is aligned with the gap 5b. An auxiliary light source would be then provided to transmit light through gap 5b and bore 45 to a photoelectric cell 46 which produces an impulse which gap 5b and bore 45 are aligned with the auxiliary light source, and conveys said pulse through a scanning line 47 to an electric system including an input amplifier 48 and an electronic or electromagnetic switch 49. When the electronic system is in quiescent condition, switch 49 contacts the terminal of a conductor 50 but is thrown into contact with the terminal of a second conductor 51 when an impulse is conveyed by the cell 46 through line 47 and input amplifier 48. In this manner, starting and stopping of the output of the series of signals passing through line 42 or from apparatus 43a can be controlled by pulses (starting and stopping) through lines 52, 53 which are connected with lines 50, 51, respectively, over two output stages 41. The transmission of a starting pulse through line 52 occurs when the longitudinal axis of bore 45 is aligned with photoelectric cell 46 for the first time, and the transmission of a stopping pulse through line 53 occurs when the axis of bore 45 is aligned with the device 46 for the second time, i.e. after a full revolution of drum D.

Alternatively, the amplifier 48 or the switch 49 may be released by the contact of the shutter in the drum camera. For example, if the camera is equipped with a so-called compur shutter, the latter's electric contact may convey the impulse to line 47 as soon as the shutter opens, an electric conductor being then provided between the non-represented electric contact of the shutter and the line 47 to unblock the circuit connected to said line. Thus, when the gap 5b passes in front of the light source, the circuit of parts 48, 49 is completed and returns into its quiescent condition upon subsequent passage of the gap 5b in front of the light source, i.e. upon a full revolution of the drum D. The shutter of the camera then closes automatically.

A repetition of a cycle of operation can be prevented in that the condensers of the light flash producing apparatus 43a are charged just sufficiently for one single cycle of operation. Such arrangement produces pictures which are exposed without any flaw along the film beginning at the gap 5b and extending once about the mantle 5. This will be described in greater detail in connection with FIGS. 8 and 9.

A further and so far unrecognized advantage residing in mounting the film externally on the drum is in that a so-constructed drum camera may be utilized with equal advantage for the production of X-ray flash pictures. The X-ray flashes are preferably produced in a spark impulse producing apparatus according to my copending application Ser. No. 771,116 entitled "High Frequency Spark Device" filed October 31, 1958, now U.S. Patent No. 2,906,924, and known under the trade name "Strobokin" by connecting an impulse transformer to the flash chamber of such apparatus. Thus, instead of light flashes, voltage impulses are produced for the X-ray tube. Generally, the emission of conventional X-ray tubes is insufficient for exposures of such short duration as are required in a high-frequency drum camera. In accordance with the present invention, this drawback of conventional X-ray tubes is avoided in that the energy of a condenser is always discharged only once into the filament of the X-ray tube. The charging of the condenser is so controlled that, during its discharge, the electric current heats the tungsten filament of the X-ray tube nearly to its melting temperature but the energy is never sufficient to actually melt the filament. The so "flashed" X-ray tube then delivers radiant energy which is sufficient for the required exposures of very short duration. A circuit of this type is shown in FIGS. 8 and 9.

FIG. 8 illustrates the above mentioned "Strobokin" circuit according to U.S. Pat. 2,906,924 with an impulse transformer and an X-ray tube connected thereto. The quenched spark gap 54 is connected in series with a three-electrode spark gap 55, and both spark gaps are fed with high voltage current through a charging resistance 56. The line 57 connects the condenser battery 58 with the quenched spark gap 54 and with the primary winding of an impulse transformer 59 whose secondary winding is connected with several taps to cause ignition of sparks between individual electrodes of the quenched spark gap 54 and eventually also to ignite the three-electrode spark gap 55. The circuit is grounded at 60. The primary winding of a second impulse transformer 61 is electrically connected to the right-hand electrode rod of spark gap 55 and to the ground 60. Full discharge current flows through said primary winding. The circuit of the X-ray tube 63 is connected to the secondary winding of transformer 61 which latter may be bridged by a safety spark gap 62 to prevent overload. The heating filament 64 of X-ray tube 63 is fed from a condenser 66 through an ignitron 65. Condenser 66 may be connected with a second condenser 69 of similar capacity over a charging resistance 67 and a switch 68, the purpose of assembly 67—69 being to facilitate adjustments in the intensity of the X-ray flashes. When high-voltage impulses are conveyed through the secondary winding of transformer 61, a small portion of the first impulse passes through an auxiliary condenser 70 and ignites the ignitron 65. The latter's ignition causes discharge of condenser 66 into the heating filament 64 of X-ray tube 63 and heats the filament to an extent slightly below the latter's melting point, the duration of the discharge being too short to bring about melting of filament 64.

FIG. 9 illustrates the X-ray tube 63 operatively associated with the drum camera. The anode 64a of tube 63 emits rays through a preparation 71 which is to be photographed, e.g. an object subjected to percussion waves. The X-rays are limited by a lead shield or screen 72 which is formed with an aperture 73 whose magnitude corresponds to that of the pictures to be produced on the photosensitive outer layer of film F. Mantle 5 of the drum D rotates in the interior of camera housing 16 in the direction indicated by arrow E. The frequency of X-ray flashes emitted by the anode 64a of tube 63 is so adjusted that a new picture is produced on the film F whenever a new length of its photosensitive layer advances in front of aperture 73 in the shield or screen 72. The synchronization of X-ray flashes is controlled by the infrared pick-up system 27—32 as described in connection with FIG. 7.

FIG. 10 shows a camera C having an objective 85 and a casing 16 whose end plate 16a is shown in partly separated position, it being pivotable about a pivot 16b. The shaft of drum D is rotatable by a repulsion motor 86 whose angular speed is controllable by a lever 87. The switch box 88 contains an electric brake for the motor 86 and a switch 89 for starting and arresting same. In actual use, i.e. during shooting of pictures, the shutter of objective 85 remains open during a full revolution of the drum D. The electronic equipment for controlling the frequency and for timing of the light- or X-ray flashes is shown at 90, the flashes being produced by apparatus 43a (or 63 in the case of X-ray operation). The marking for properly locating the drum D with respect to the camera housing 16 are indicated by reference numeral M.

Normally the height of frame of the individual picture is adjusted relative to the flash frequency and the travelling speed of the film by masks, according to the formula H·F=S; H being height of frame in cm., F being the flash frequency per second and S the travelling speed of the film in cm./s.

When operating with X-rays such masks are made of lead or some other material of great atomic weight. In the prior art such masks were in the form of insertable sheets. In contrast to prior art the present invention makes use of infinitely variable sliding masks made of sheet metal of high strength, e.g. steel, in form of two cylindrical sheet metal members which can be moved against each other and which are fitted to the inner perimeter of the camera housing.

This feature of the present invention offers the advantage in case the film snaps at high rotating speeds that there will occur no damage in the camera. The torn film slides along the smooth interior wall of the cylindrical masks and is gradually shredded to pieces; there is, however, no danger that the film melts through spontaneous friction and suddenly blocks the rotating drum which has great kinetic energy. In FIG. 10 these variable masks are shown at 74. They replace in this case screen 72 with aperture 73 as shown in FIG. 9.

It will be understood that each of the elements described above, or two or more together, may also find a useful application in other types of cameras differing from the types described above.

Without further analysis, the foregoing will so fully reveal the gist of the present invention that others can by applying current knowledge readily adapt it for various applications without omitting features that, from the standpoint of prior art, fairly constitute essentially characteristics of the generic and specific aspects of this invention and, therefore, such adaptations should and are intended to be comprehended within the meaning and range of equivalence of the following claims.

What is claimed as new and desired to be secured by Letters Patent is:

1. A high frequency camera comprising, in combination: a stationary housing; a hollow drum rotatably mounted in said housing, the drum having a film supporting mantle formed with a gap for the passage of a film therethrough; means for continuously rotating the drum through at least one full revolution; a film supply spool and a film take-up spool rotatably mounted in said drum; a strip of film extending from said film supply spool through said gap and around said mantle back through said gap to said take-up spool antifriction bearing means for rotatably supporting at least one of said spools; means for producing a high-frequency series of radiation flashes directed to a selected portion of said film supporting mantle to expose portions of said film strip during its rotation with said drum; and electronic means for synchronizing the high frequency of said radiation flashes with the circumferential speed of said strip of film during rotation of said drum for producing separate pictures on consecutive portions of said film strip.

2. A high frequency camera comprising, in combination: a stationary housing; a hollow drum rotatably mounted in the housing, the drum having a film supporting mantle formed with a gap for the passage of a film therethrough and an end wall; means for continuously rotating the drum through at least one full revolution; a film supply spool and a film take-up spool rotatably mounted on said end wall and located in the drum, each spool having an end adjacent to the end wall and a ratchet wheel connected to said end; pawl means mounted on the end wall; resilient means for constantly biasing the pawl means into engagement with the ratchet wheels for preventing rotation of said spools; means carried by the housing for disengaging the pawl means from the wheels when the drum is arrested; a strip of film extending from said film supply spool through said gap and around said mantle back through said gap to said take-up spool; antifriction bearing means for rotatably supporting at least one of said spools; means for producing a high-frequency series of radiation flashes directed to a selected portion of said film supporting mantle to expose portions of said film strip during its rotation with said drum; and electronic means for synchronizing the high-frequency of said radiation flashes with the circumferential speed of said strip of film during rotation of said drum for producing separate pictures on consecutive portions of said film strip.

3. A high frequency camera comprising, in combination: a stationary housing; a hollow drum rotatably mounted in the housing, the drum having a film supporting mantle formed with a gap for the passage of a film therethrough and an end wall; means for continuously rotating the drum through at least one full revolution; a film supply spool and a film take-up spool rotatably mounted on said end wall and located in the drum, each spool having an end adjacent to the end wall and a ratchet wheel connected to said end; pawl means mounted on the end wall; resilient means for constantly biasing the pawl means into engagement with the ratchet wheel for preventing rotation of said spools; a push-button having a shaft axially slidably mounted in the housing for disengaging the pawl means from the wheels when the drum is arrested; means for indicating the position of said drum in which the shaft of said push-button is aligned with said pawl means; a strip of film extending from said film supply spool through said gap and around said mantle back through said gap to said take-up spool; antifriction bearing means for rotatably supporting at least one of said spools; means for producing a high-frequency series of radiation flashes directed to a selected portion of said film supporting mantle to expose portions of said film strip during its rotation with said drum; and means for synchronizing the high-frequency of said radiation flashes with the circumferential speed of said strip of film during rotation of said drum for producing separate pictures on consecutive portions of said film strip.

4. A high frequency camera comprising, in combination: a stationary housing; a hollow drum rotatably mounted in the housing, the drum having a film supporting mantle formed with a gap for the passage of a film therethrough and an end wall; means for continuously rotating the drum through at least one full revolution; a film supply spool and a film take-up spool rotatably mounted on said end wall and located in the drum, each spool having an end adjacent to the end wall and a ratchet wheel connected to said end; pawl means mounted on the end wall; resilient means for constantly biasing the pawl means into engagement with the ratchet wheels for preventing rotation of said spools; a push-button having a shaft axially slidably mounted in the housing for disengaging the pawl means from the wheels when the drum is arrested; means for indicating the position of said drum in which the shaft of said push-button is aligned with said pawl means; a strip of film extending from said film supply spool through said gap and around said mantle back through said gap to said take-up spool; anti-friction bearing means for rotatably supporting at least one of said spools; crank means located externally of and rotatably supported by the housing for rotating the spools upon disengagement of the pawl means from said ratchet wheels; means for producing a high-frequency series of radiation flashes directed to a selected portion of said film supporting mantle to expose portions of said film strip during its rotation with said drum; and means for synchronizing the high-frequency of said radiation flashes with the circumferential speed of said strip of film during rotation of said drum for producing separate pictures on consecutive portions of said film strip.

5. A high frequency camera comprising, in combination: a stationary housing; a hollow drum rotatably mounted in the housing, the drum having a film supporting mantle formed with a gap for the passage of a film therethrough and an end wall; means for continuously rotating the drum through at least one full revolution; a film supply spool and a film take-up spool rotatably mounted on said end wall and located in the drum, each spool having an end adjacent to the end wall and a ratchet wheel connected to said end; pawl means mounted on the end wall; resilient means for constantly biasing the pawl means into engagement with the ratchet wheels for preventing rotation of said spools; a push-button having a shaft axially slidably mounted in the housing for disengaging the pawl means from the wheels when the drum is arrested; means for indicating the position of said drum in which the shaft of said push-button is aligned with said pawl means; antifriction bearing means for rotatably supporting at least one of said spools; crank means located externally of and having shaft means axially slidably received in the housing, the shaft means being aligned with said spools and adapted to engage same when the pawl means is disconnected from the ratchet wheels; spring means for constantly urging the shaft means in a direction away from the spools; a strip of film extending from said film supply spool through said gap and around said mantle back through said gap to said take-up spool; means for producing a high-frequency series of radiation flashes directed to a selected portion of said film supporting mantle to expose portions of said film strip during its rotation with said drum; and means for synchronizing the high-frequency of said radiation flashes with the circumferential speed of said strip of film during rotation of said drum for producing separate pictures on consecutive portions of said film strip.

6. A high frequency camera comprising, in combination: a housing; a hollow drum rotatably mounted in the housing, the drum having a mantle formed with a gap; means for rotating the drum; a supply spool and a take-up spool rotatably mounted in the drum; antifriction bearing means for rotatably supporting at least one of the spools; a strip of photosensitive film comprising a longitudinal margin and a plurality of perforations in said margin, the film extending from the supply spool through the gap about the mantle and through the gap to the take-up spool; means for rotating the spools in two directions for paying out the film from the supply spool to the take-up spool and for rewinding the film onto the supply spool; means for producing a series of radiation flashes in response to impulses caused by the perforations in said film, said means comprising a source of light, means for directing the light onto the film margin in line with said perforations, impulse producing means in the path of light reflected by the film and periodically varied by the passage of said perforations through the light directed at said margin when said drum is rotated, a radiation flash producing apparatus for directing radiation flashes toward said mantle of said drum, and means for conveying selected impulses from said impulse producing means to said apparatus; and means for timing the discharge of flashes in response to said selected impulses, said timing means comprising condenser means for supplying current to said apparatus sufficient to produce a single flash at a time thereby to prevent double exposure of the film.

7. A high frequency camera comprising, in combination: a housing; a hollow drum rotatably mounted in the housing, the drum having a mantle formed with a gap; means for rotating the drum; a supply spool and a take-up spool rotatably mounted in the drum; antifriction bearing means for rotatably supporting at least one of the spools; a strip of photosensitive film comprising a longitudinal margin and a plurality of perforations in said margin, the film extending from the supply spool through the gap about the mantle and through the gap to the take-up spool; means for rotating the spools in two directions for paying out the film from the supply spool to the take-up spool and for rewinding the film onto the supply spool; means for producing a series of radiation flashes in response to impulses caused by the perforations in said film, said means comprising a source of light, means for directing the light onto the film margin in line with said perforations, an impulse producing photoelectric cell in the path of light reflected by the film and periodically varied by the passage of said perforations through the light directed at said margin when said drum is rotated, a radiation flash producing apparatus for directing radiation flashes toward said mantle of said drum, and means for conveying selected impulses from said cell to said apparatus; and means for timing the discharge of flashes in response to said selected impulses, said timing means comprising condenser means electrically connected with said cell for supplying current to said apparatus sufficient to produce a single flash at a time thereby to prevent double exposure of the film.

8. A high frequency camera comprising, in combination: a housing; a hollow drum rotatably mounted in the housing, the drum having a mantle formed with a gap; means for rotating the drum; a supply spool and a take-up spool rotatably mounted in the drum; antifriction bearing means for rotatably supporting at least one of the spools; a strip of photosensitive film comprising a longitudinal margin and a plurality of perforations in said margin, the film extending from the supply spool through the gap about the mantle and through the gap to the take-up spool; means for rotating the spools in two directions for paying out the film from the supply spool to the take-up spool and for rewinding the film onto the supply spool; means for producing a series of radiation flashes in response to impulses caused by the perforations in said film, said means comprising a source of light, means for directing the light onto the film margin in line with said perforations, a photoelectric cell in the path of light reflected by the film and periodically varied by the passage of said perforations through the light directed at said margin when said drum is rotated for producing an impulse in response to the passage of each perforation in front of the light source when the drum is rotated, discriminator means and switch means electrically connected with said cell for selectively conveying only certain or all impulses transmitted by said cell, a radiation flash producing apparatus connected to said switch means for directing radiation flashes toward said mantle of said drum to expose the film in response to impulses transmitted by said switch means; and control means electrically connected with said apparatus for starting and terminating the discharge of flashes and including photosensitive means exposed to light from said source passing through said gap in said mantle of said drum during revolution of the latter, exposure of said photosensitive means to light passing through said gap resulting in actuation of said control means, the discharge of flashes beginning when the gap passes in front of said light source for the first time and terminating when the drum performs a full revolution and the gap passes in front of the light source for the second time.

9. A high frequency X-ray camera comprising, in combination: a housing; a hollow drum rotatably mounted in the housing, the drum having a mantle formed with a gap; means for rotating the drum; a supply spool and a take-up spool rotatably mounted in the drum; antifriction bearing means for rotatably supporting at least one of the spools; a strip of photosensitive film comprising a longitudinal margin and a plurality of perforations in said margin, the film extending from the supply spool through the gap about the mantle and through the gap to the take-up spool; means for rotating the spools in two directions for paying out the film from the supply spool to the take-up spool and for rewinding the film onto the supply spool; means for producing a series of X-ray flashes in response to impulses caused by the perforations in said film, said means comprising a source of light, means for directing the light onto the film margin in line with said perforations, impulse producing means in the path of light reflected by the film and periodically varied by the passage of said perforations through the light directed at said margin when said drum is rotated, and an X-ray flash producing apparatus for directing X-ray flashes toward said mantle of said drum and comprising an X-ray tube and a spark impulse producing circuit connected to said impulse producing means, said spark impulse producing circuit comprising a flash chamber and an impulse transformer connected with the X-ray tube and impulse selector means for transmitting from said impulse transformer to said X-ray tube voltage impulses in response to selected impulses produced by said impulse producing means whereby the tube emits X-ray flashes to expose the film; and means for controlling the discharge of X-ray flashes and for starting and terminating the discharge of flashes and for limiting the same to a period corresponding to that required for a full revolution of the drum.

10. A high frequency X-ray camera comprising, in combination: a housing; a hollow drum rotatably mounted in the housing, the drum having a mantle formed with a gap; means for rotating the drum; a supply spool and a take-up spool rotatably mounted in the drum; antifriction bearing means for rotatably supporitng at least one of the spools; a strip of photosensitive film comprising a longitudinal margin and a plurality of perforations in said margin, the film extending from the supply spool through the gap about the mantle and through the gap to the take-up spool; means for rotating the spools in two directions for paying out the film from the supply spool to the take-up spool and for rewinding the film onto the supply spool; means for producing a series of X-ray flashes in response to impulses caused by the perforations in said film, said means comprising a source of light, means for directing the light onto the film margin in line with said perforations, impulse producing means in the path of light reflected by the film and periodically varied by the passage of said perforations through the light directed at said margin when said drum is rotated, an X-ray flash producing apparatus for directing X-ray flashes toward said mantle of said drum and comprising an X-ray tube having a filament and a spark impulse producing circuit connected to said impulse producing means, said spark impulse producing circuit comprising a flash chamber, an impulse transformer and a discharge condenser connected to said filament for heating same slightly below the melting temperature during each discharge of an X-ray flash, the time of discharge being insufficient to heat the filament to melting temperature.

11. A high frequency camera, comprising, in combination, a housing; a hollow drum rotatably mounted in said housing, said drum having a film supporting mantle formed with a gap for the passage of a film therethrough; means for continuously rotating said drum through at least a full revolution; a film supply spool and a film take-up spool rotatably mounted in said drum; a strip of film extending from said film supply spool through said gap and around said mantle back through said gap to said take-up spool, said strip of film comprising a longitudinal margin and a plurality of perforations in said margin; antifriction bearing means for rotatably supporting at least one of said spools; flash producing means for producing a high-frequency series of radiation flashes directed to a selected portion of said film supporting mantle to expose portions of said film strip during its rotation with said drum; electronic means for synchronizing the high-frequency of said radiation flashes, said electronic means for synchronizing the frequency of said radiation flashes comprising control means for controlling the production of a series of radiation flashes by said flash producing means in response to impulses caused by the perforations in said film, said control means comprising a source of light, means for directing said light into the film margin in line with said perforations, impulse producing means in the path of said light reflected by the film and periodically varied by the passage of said perforations through said light directed at said margin when said drum is rotated, and means for conveying selected impulses from said impulse producing means to said flash producing means; and means for timing the discharge of flashes in response to said selected impulses, said timing means comprising condenser means for supplying current to said flash producing means sufficient to produce a single flash at a time thereby to prevent double exposure of the film.

12. A high frequency camera, comprising, in combination, a housing; a hollow drum rotatably mounted in said housing, said drum having a film supporting mantle formed with a gap for the passage of a film therethrough; means for continuously rotating said drum through at least a full revolution; a film supply spool and a film take-up spool rotatably mounted in said drum; a strip of film extending from said film supply spool through said gap and around said mantle back through said gap to said take-up spool, said strip of film comprising a longitudinal margin and a plurality of perforations in said margin; antifriction bearing means for rotatably supporting at least one of said spools; flash producing means for producing a high-frequency series of radiation flashes directed to a selected portion of said film supporting mantle to expose portions of said film strip during its rotation with said drum; electronic means for synchronizing the high-frequency of said radiation flashes, said electronic means for synchronizing the frequency of said radiation flashes comprising control means for controlling the production of a series of radiation flashes by said flash producing means in response to impulses caused by the perforations in said film, said control means comprising a source of light, means for directing said light onto the film margin in line with said perforations, a photo-electric cell in the path of said light reflected by the film and periodically varied by the passage of said perforations through said light directed at said margin when said drum is rotated for producing an impulse in response to the passage of each perforation in front of the light source when the drum is rotated, discriminator means and switch means electrically connected with said cell for selectively conveying only certain or all impulses transmitted by said cell to said flash producing means; and control means electrically connected with said apparatus for starting and terminating the discharge of flashes and including photosensitive means exposed to light from said source passing through said gap in said mantle of said drum during revolution of the latter, exposure of said photosensitive means to light passing through said gap resulting in actuation of said control means, the discharge of flashes beginning when the gap passes in front of said light source for the first time and terminating when the drum performs a full revolution and the gap passes in front of the light source for the second time.

References Cited in the file of this patent

UNITED STATES PATENTS

| | | |
|---|---|---|
| 439,121 | Crane | Oct. 28, 1890 |
| 575,431 | Schoenfelder et al. | Jan. 19, 1897 |
| 2,517,781 | Gacki et al. | Aug. 8, 1950 |
| 2,526,094 | Stava | Oct. 17, 1950 |
| 2,872,318 | Starck | Feb. 3, 1959 |
| 2,875,056 | Smith et al. | Feb. 24, 1959 |